(12) United States Patent
Metzger (10) Patent No.: US 6,523,333 B2
(45) Date of Patent: Feb. 25, 2003

(54) SENSOR ARM FOR COMBINE HEADER

(76) Inventor: Leo A. Metzger, 4127 Dungan Rd., Circleview, OH (US) 43114

( * ) Notice: Subject to any disclaimer, the term of this patent is extended or adjusted under 35 U.S.C. 154(b) by 0 days.

(21) Appl. No.: 09/731,145

(22) Filed: Dec. 6, 2000

(65) Prior Publication Data

US 2002/0069628 A1 Jun. 13, 2002

(51) Int. Cl.[7] .............................................. A01D 75/28
(52) U.S. Cl. .................. 56/10.2 E; 56/208; 56/DIG. 10
(58) Field of Search ............................. 56/10.2 B, 208, 56/DIG. 10, 14.9, 15.8, 10.4, 34, 35, 209, 10.2 R, DIG. 15; 172/7, 8; 364/424.07

(56) References Cited

U.S. PATENT DOCUMENTS

| | | | | |
|---|---|---|---|---|
| 3,196,599 A | * | 7/1965 | Meiners et al. .......... 56/10.2 E |
| 4,147,016 A | * | 4/1979 | Jensen et al. ................. 56/15.8 |
| 4,199,925 A | * | 4/1980 | Quick et al. .................... 56/208 |
| 4,942,724 A | * | 7/1990 | Diekhans et al. ............. 56/10.4 |
| 5,577,373 A | * | 11/1996 | Panoushek et al. ....... 56/10.2 E |
| 5,713,190 A | * | 2/1998 | Vermeulen et al. ....... 56/10.2 E |
| 5,937,621 A | * | 8/1999 | Eggenhaus ................ 56/10.2 E |
| 6,041,583 A | * | 3/2000 | Goering et al. .......... 56/10.2 E |

* cited by examiner

Primary Examiner—Thomas B. Will
Assistant Examiner—Árpád Fábián Kovács (57) ABSTRACT

In a control system for an agricultural combine having an adjustable platform, a sensor arm is coupled to a rotatable sensor shaft and adapted to engage and ride along the ground to monitor the operating height of the platform. The sensor arm has a continuously curved operation portion and provides a faster response time as ground contour changes are encountered. Moreover, the response increases for lower operating heights to reduce the possibility that the platform will contact the ground and to reduce the time to adjust the operating height to the desired setting. Thus, operating speed and productivity may be increased.

9 Claims, 7 Drawing Sheets

SENSOR ARM FOR COMBINE HEADER

FIELD OF THE INVENTION

The present invention relates to a control system for maintaining the operating height of the header of an agricultural combine, and for raising and lowering the header to maintain a constant operating height, as set by the operator, as the combine traverses variations in ground contour.

BACKGROUND OF THE INVENTION

A system for controlling the height of the header of some currently available agricultural combines, such as the Case/New Holland 2300 Series, includes an electrical sensor coupled to a rotatable sensor shaft on which there is mounted an elongated arm referred to as a "sensor arm." The sensor arm of the prior art is in the form of a ground runner which engages and rides over the surface of the soil. The distance between the header and the ground is called the "operating height." The operating height may change either because the operator sets a new operating height from the combine cab, or because ground contour changes as the combine moves to harvest crop. When the operating height changes due to a variation in ground contour, the sensor arm rotates the sensor shaft in one direction if the sensed operating height increases and in a counter direction if the operating height decreases. A closed-loop control system on the combine then raises or lowers the header accordingly to effect the operating height previously set by the operator. A second control system may be present on the combine, by which the lateral attitude of the header is controlled to maintain the outboard ends of the header at the same height with respect to the ground.

SUMMARY OF THE INVENTION

The present invention improves the operating performance of the prior art combine header operating height control system and lateral attitude control system (if present) described above by configuring the sensor arm so that it has an operating segment which is curved, as opposed to the prior art sensor arms which are characterized as having long straight sections. This provides a contact point with the ground (whether level or a rise or depression) which moves forward, toward a vertical plane passing through the center of sensor shaft, as the operating height decreases. The contact point moves rearward, away from the vertical plane, as the operating height increases. In other words, as the operating height decreases (e.g., a rise in the ground is encountered by the sensor), the contact point on the curved segment of the sensor arm in contact with the ground moves forward, thereby reducing the distance between the contact point and the center (or axis) of rotation of the sensor shaft. This creates a shorter lever arm for the sensor and results in a quicker response as well as a proportionately greater magnitude of response when the operating height is set at smaller values, for a given change in the ground. It is, of course, desirable to have responses which are faster and of greater magnitude when the operating height is set at smaller values because it enables the operator to traverse the ground at higher speeds without fear of running the snout of the header into the ground.

Thus, the present invention has two advantages over the prior art. First, the fore-to-aft distance between the sensor shaft and the ground contact point decreases continuously as the header is lowered (or the operating height decreases for any reason). This provides a faster system response time because the horizontal distance between the sensor shaft (and the forwardmost point of the header) and the ground contact point of the sensor arm is decreased. Thus, the sensed error occurs closer to real time and results in a reduced latency in the response time. This is a substantial operational advantage because it increases the ground speed at which the combine is able to operate with satisfactory results and without risking running the nose of the header into the ground.

Secondly, the curved contour of the ground-engaging or operating segment of the sensor arm of the present invention also shortens the distance between the axis of rotation of the sensor arm and the ground contact point of the sensor arm as the operating height decreases. The distance between the center of the sensor shaft and the ground contact point of the sensor arm is sometimes referred to as the "sensor lever arm." The length of the sensor lever arm determines the magnitude of the system response to a given variation in the operating height of the header. That is, the shorter the sensor lever arm, the greater is the angular displacement (i.e., rotation) of the sensor shaft for any given change in ground contour, including both increases and decreases. This feature provides a ratio-changing sensor arm in that the ratio of angular displacement of the sensor shaft increases for a given change in ground contour when the operating height is set to a lower value by the operator.

As a result, when the header is set to a lower operation height and passes over a rise in the ground, the sensor error signal is increased for a given rise in ground contour, and the magnitude of the system response is increased. The resulting operational characteristic is substantially improved, and both features (i.e., reduced response time and increased system response) are cumulative to increase the ground speed at which the combine may satisfactorily operate.

Other features and advantages of the present invention will be apparent to persons skilled in the art from the following detailed description of the illustrated embodiment accompanied by the attached drawing wherein identical reference numerals will refer to like part in the various views.

DETAILED DESCRIPTION OF THE PREFERRED EMBODIMENT

Figure 1:
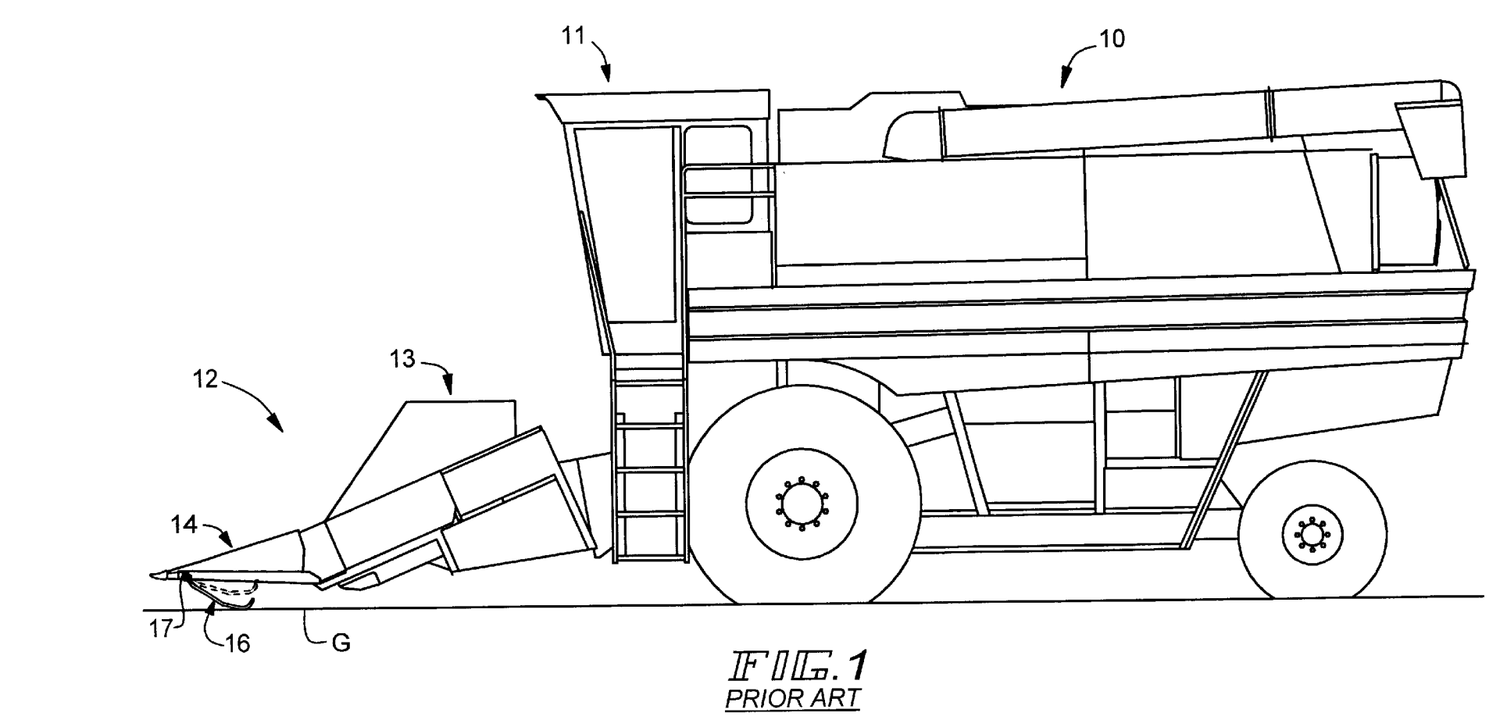
FIG. 1 is a left side elevational view of an agricultural combine according to the prior art.

Turning first to FIG. 1, reference numeral 10 generally designates a known agricultural combine such as Model 2388 sold by Case Corporation of Racine, Wis. The main functions of an agricultural combine, of course, are to cut the plants being harvested, separate the seed from the remainder of the plant, and store the seed internally until it is delivered to another vehicle for transporting the seed to storage.

At the forward end of the combine 10 is an operator's cab generally designated 11, from which an operator controls the various functions of the combine, and which provides an advantageous overview of the forward, crop-cutting portion of the machine, generally designated by reference numeral 12. The crop-cutting portion includes a header generally designated 13 which is conventionally mounted to the frame of the combine and which includes hydraulic actuators (hydraulic cylinders) for raising and lowering the header, and it will be further described within. Since the present invention, as persons skilled in the art will appreciate, does not depend on any particular type of header for its improved results, the terms "header" or "platform" are intended to broadly refer to all types of combine headers, but with particular application and advantage to corn heads and to so-called "rigid headers" of the type used to harvest small grains such as wheat and rice.

At the forward portion of the header 13, there is mounted what is referred to as the "snout" generally designated as reference numeral 14. The snout includes a number of covered, pointed members which are spaced across the front of the header and located by the operator to straddle adjacent rows of crop. Adjacent snouts guide the crop row to a cutter mechanism for severing the crop. The crop is then elevated by a conveyor in the header and carried into the main body of the combine for separating and storing the seed while returning the chaff to the ground behind the vehicle.

Figure 2:
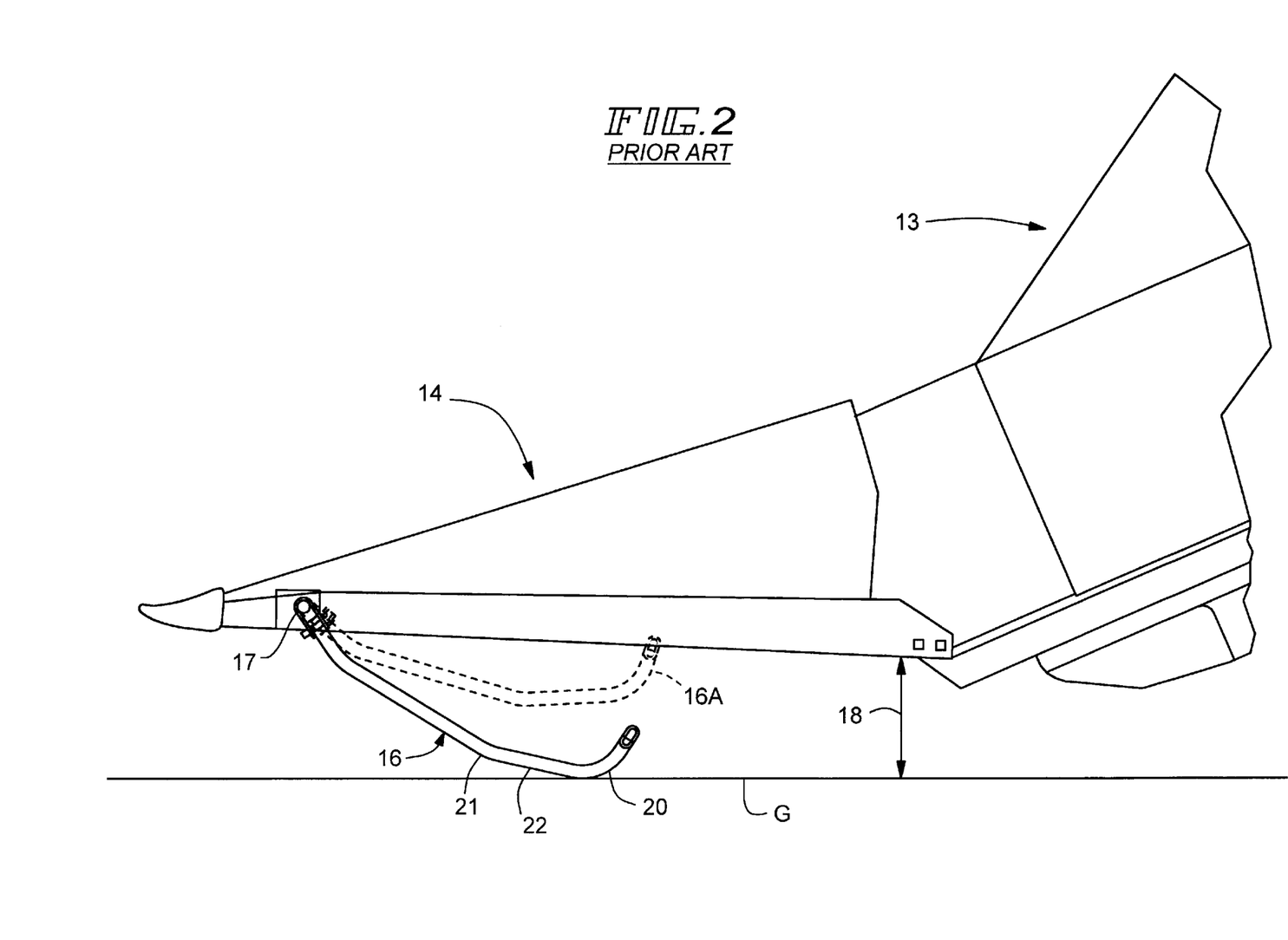
FIG. 2 is a close-up view of the prior art combine of FIG. 1, showing the snout of the header assembly and the prior art sensor arm, with the sensor arm shown in dashed lines in a raised position, as when a rise is encountered.

The snout 14 operates at a predetermined height above the ground which is referred to as the "operating height" and is illustrated by the arrow 18 in FIG. 2. The operating height is set and may be adjusted by the operator. The combine is equipped with a closed-loop feedback system, to be described below, which maintains the operating height at the level set by the operator. If a ground rise (i.e., an increased slope or a bump) is encountered, it is sensed by counter-clockwise rotation of a sensor arm 16, and the control system raises the header 13 and snout 14 (i.e., the platform) so that the operating height adjusts to that set by the operator. Conversely, if a recess or depression or lowering slope is encountered in the ground, it is sensed by clockwise rotation of the sensor arm 16, and the control system lowers the header 13 and the snout 14 to adjust the operating height 18 to that set by the operator.

In summary, in addition to controlling the operating height of the snout by the operator, it is desirable to have the platform be raised and lowered as variations in ground contour are experienced to avoid contact with the ground and to maintain a constant header-to-crop relationship for best results. Moreover, because of the variations in crop, and thus the desired operating height of the snout, it is desirable that the control system for setting the operating height of the header be capable of operating over a range of operating heights, typically two to eight inches.

It is also important that the control system for adjusting the height of the header in response to variations in operating conditions be capable of reacting quickly. The faster the control system is capable of adjusting the operating height of the header, the faster the combine may traverse the ground. Thus, in the past, delays in the speed of adjusting the operating height of the header have limited the ground speed, and thus the productivity, of the combine.

Still referring to FIG. 1, beneath the forward portion of the snout 14, sensor arm 16 is mounted to a sensor shaft 17. In FIG. 1, the sensor arm 16 is shown in solid line in its normal position, engaging the ground which is represented by the horizontal line G. The sensor arm rides along the ground as the combine moves forward (i.e., to the left in FIG. 1). If an obstruction or mound is encountered or if the slope of the ground changes, the sensor arm 16 is free to rise to the position shown in dashed line in FIG. 1 or to lower if conditions require it to do so.

Turning now to FIG. 2, the sensor arm 16 is again seen in solid line contacting the ground, and in dashed line at 16A, in a raised position, simulating encountering a rise or obstruction or an increase in slope. It can be seen that in raising to the position 16A, the sensor arm has rotated counterclockwise, when viewed from the left, thereby rotating the sensor shaft 17 counterclockwise.

The prior art sensor arm 16 is characterized as having a rear curved portion 20 and a forward bent portion 21, separated by a straight portion 22 of substantial length in relation to the portion which engages the ground. As will be further explained below, the prior art sensor arm 16 operates, for the greater operating heights of the header, primarily in the region of the rear curved portion 20; and for the lower range of operating heights, the sensor arm 16 operates in the region of the forward bent portion 21. The system seen in FIG. 2 does not operate in the straight portion 22 nor forward of the curved bent portion 21 for normal conditions.

Figure 4:
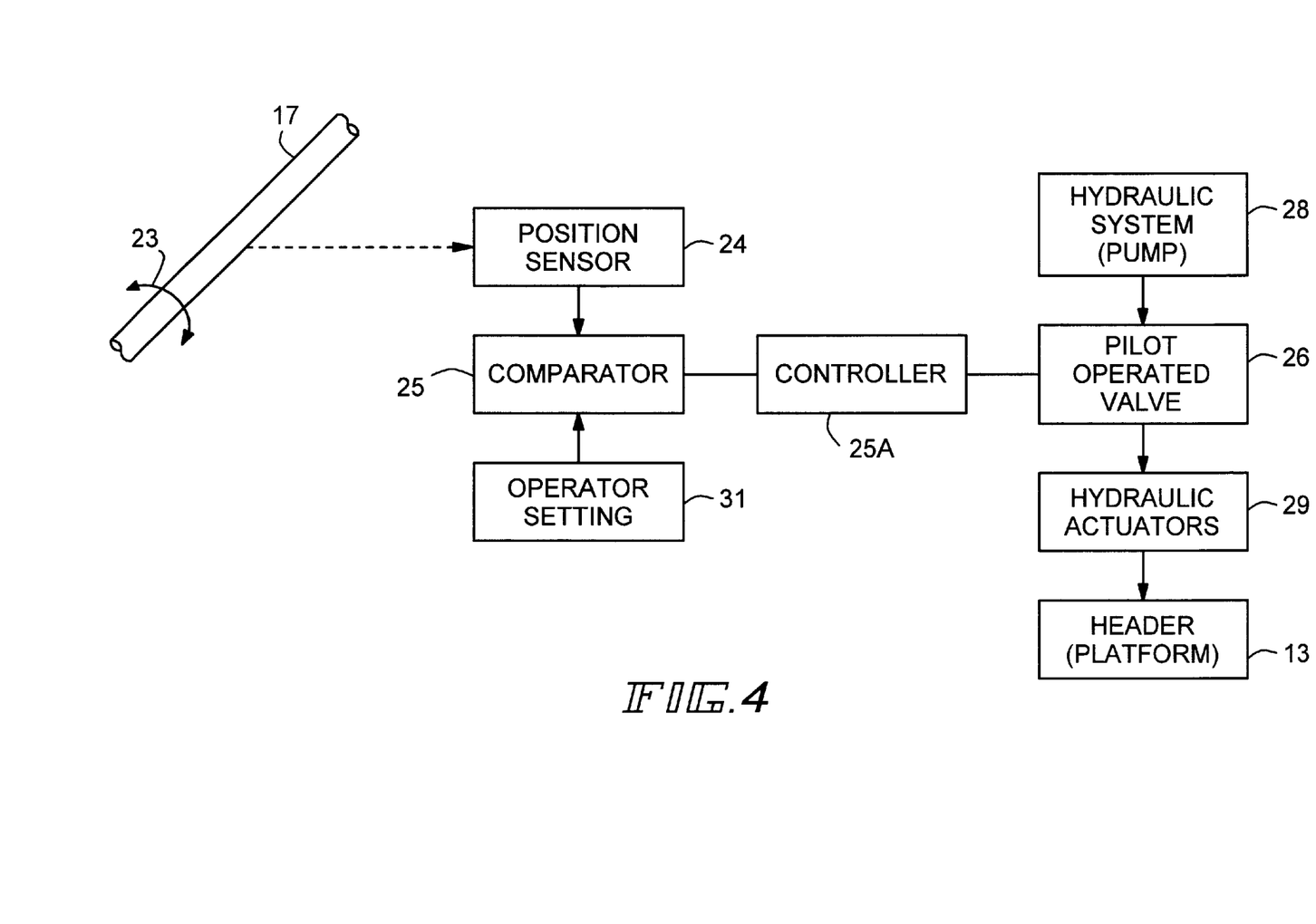
FIG. 4 is a functional block diagram of a control system for raising and lowering the header.

Turning now to FIG. 4, the sensor shaft 17 may be rotated about its axis in either angular direction, indicated by the arrow 23, depending upon the movement of the sensor arm 16. A potentiometer or other electronic or magnetic position sensor responsive to the angular position of the shaft 17, and illustrated by the block 24, is coupled to or operatively associated with the sensor shaft 17 and generates a signal representative of the angular position of the sensor shaft 17. The output signal of the electronic position sensor 24 is fed to a comparator 25, which also receives a signal from the operator setting control 31 indicating the desired operating height. Thus, comparator 25 generates an error signal representative of (i.e., proportional to) the difference between the actual or sensed height of the header and the desired or set height of the header. The output of comparator 25 is fed to a controller 25A which operates a pilot-operated hydraulic valve 26 which is connected in an hydraulic circuit which includes a pump which supplies pressure to the hydraulic system of the combine, generally indicated within the block 28. In series with the pump 28 and valve 26 are hydraulic actuators 29 which typically are hydraulic cylinders for raising and lowering the header 13.

With the electro-hydraulic system described, the operator sets an operating height for the header using the operator setting 31. This setting defines the operating height at which he desires the header to operate under ordinary, level conditions. This setting is typically set by a lever or rotary control in the operator's cab, and schematically represented in the block 31.

The system shown in FIG. 4 will be recognized as a closed loop feedback system. Changing the operator's setting generates a ground sensor error signal which produces a representative signal which is fed into the controller 25A to establish a steady state level for continued operation. If the shaft 17 is in a position which indicates the actual operating height is the same as the operating height set by the operator, the error signal will not actuate the controller 25A which, in turn, does not actuate the valve 26. If the position of the sensor shaft 17 indicates that the distance between the ground and the header is lower than the operator's setting, an error signal is generated and fed to the controller 25A, and the controller actuates the valve 26 so that the hydraulic actuators raise the header 13 correspondingly. On the other hand, if the position of the shaft 17 indicates that the header is higher than the desired operator setting, the system will actuate the hydraulic valve 26 to lower the header to the desired setting.

The hydraulic control system shown in FIG. 4 continues to operate in the manner described, and if an obstruction, rise or depression is encountered by the sensor arm during the course of operation, a corresponding signal is generated by the controller 25A to actuate the valve 26 and set the operating height of the header to the present level.

Figure 5:
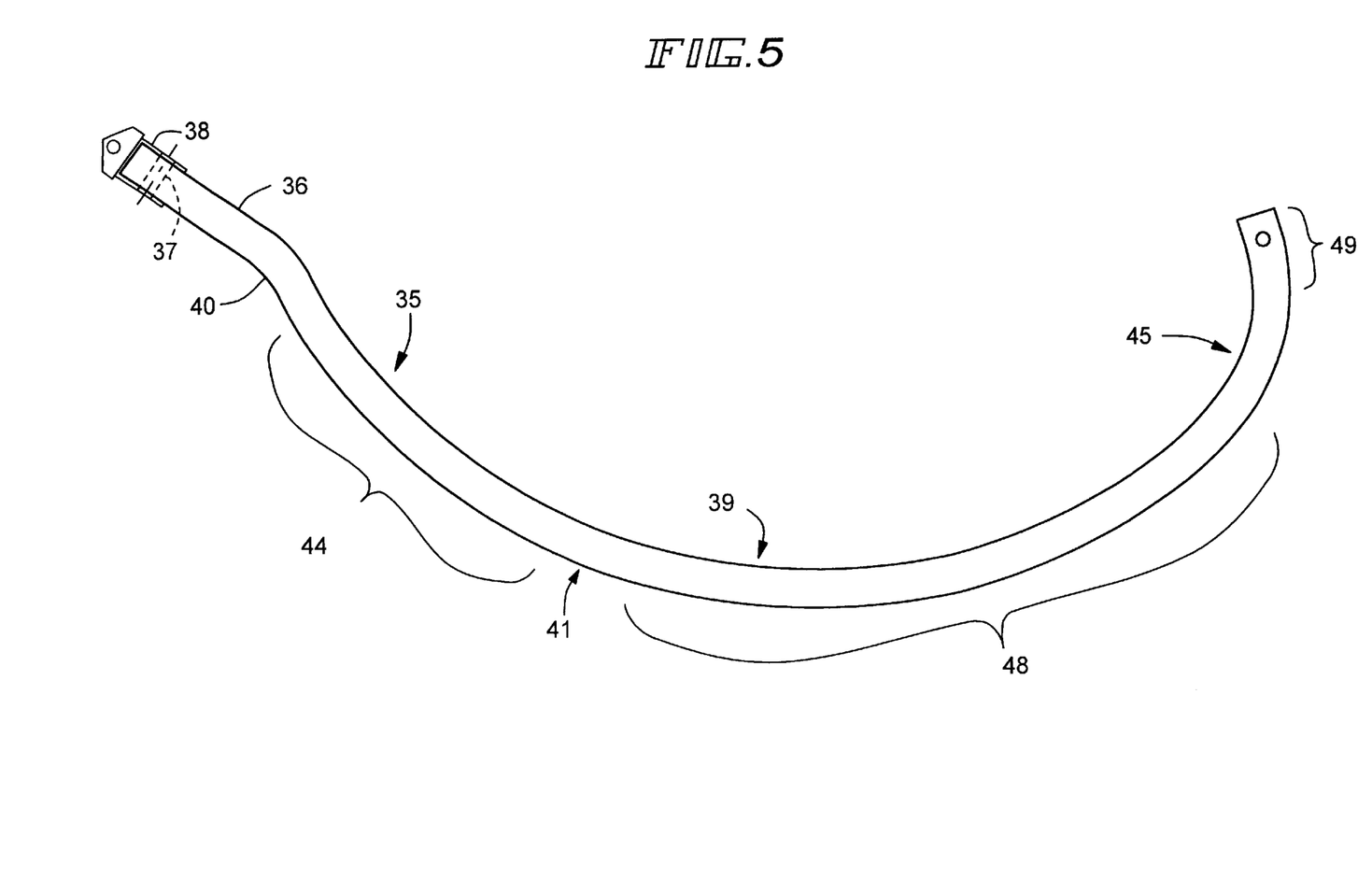
FIG. 5 is a close up side elevational view of the improved sensor arm of the present invention.

Turning now to FIG. 5, there is shown a sensor arm generally designated 35 constructed according to the present invention. The sensor arm 35 includes a forward mounting portion 36 which may be straight, as shown in FIG. 5. The sensor arm 35 of the illustrated embodiment is provided with an aperture 37 for receiving a mounting bolt securing the sensor arm 35 to a support bracket 38 which is mounted to the sensor shaft 17. From the end of the straight mounting portion 36, which may extend a few inches, substantially the entire remainder of the operating portion of the sensor arm 35 is curved, so that if the header is in its normal range of operating height, the operating portion of the sensor arm 35 (i.e., that portion which contacts the ground under normal operation) is curved. Due to the curved nature of the operating portion of the sensor arm, as the header is raised by the operator, the contact point moves or rolls to the rear, and the distance between the center or axis of the sensor shaft 17 and the ground contact point increases. This distance between the center of shaft 17 and the ground contact point is a straight line and is called the "sensor lever arm." Conversely, as the header is lowered by the operator, the contact point moves forward and the sensor lever arm decreases.

In a preferred embodiment, the operating portion 39 of the improved sensor arm is continuously curved and may be divided into two separate regions having different curvatures. A first curved portion extends approximately from the region designated 40 in FIG. 5, which is adjacent the sensor shaft 17, to the intermediate location designated 41. The radius of curvature of this leading curved portion enclosed within the bracket 44 is approximately 3⅜ inches on the inner surface of the arm; and it may extend for a sector of approximately 70°. The rear curved section of the operating portion of the sensor arm portion extends from the location identified by reference numeral 41 to that identified by reference numeral 45 and is indicated by bracket 48. This rear curved section may have a radius of curvature of approximately 10¾ inches and extend for a sector of approximately 85° based on the center of the radius of curvature. The final section of the sensor arm indicated by the bracket 49 need not be curved because it is not an operating portion of the sensor arm in the sense that it does not normally contact the ground under normal height settings, but it may have a radius of approximately 3⅜ inches and extend for a sector of approximately 25° (reference is made to the radius of the center or axis of the metal bar forming the sensor arm).

Although the illustrated embodiment has two curved sections making up the operating portion of the sensor arm, persons skilled in the art will appreciate that many of the improved benefits flowing from the invention may be achieved by having the operating portion comprised of even a single curved section extending substantially through a major portion of the operating portion of the sensor arm, particularly at the portion which is active at the lower header settings, or a curvature of continuously varying radius, or a series of curved sections with or without intervening straight sections according to use requirements.

Figure 3:
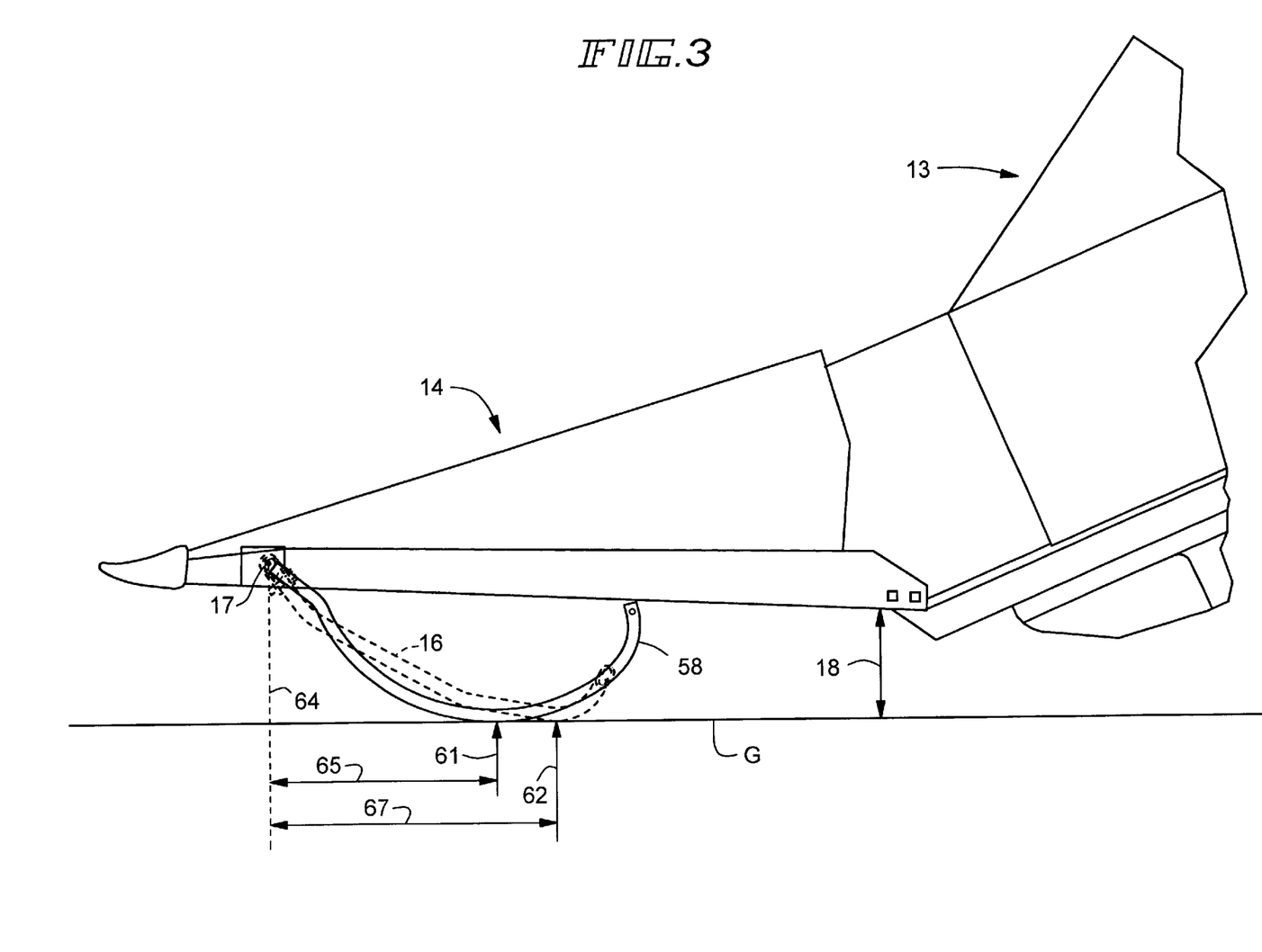
FIG. 3 is a view similar to FIG. 2 showing the improved sensor arm of the present invention.

Referring now to FIG. 3, the operating height is again indicated by the arrow 18, and it will be seen that the contact point for the improved sensor arm is indicated by reference numeral 61, whereas the contact point for the prior art sensor arm 16 is indicated at 62. It will also be seen from FIG. 3 that the horizontal distance indicated by arrow 65 which is the distance between the contact point 61 of the improved sensor arm and the forward location of the axis of rotation of the sensor shaft 17 (indicated by the dashed line 64) is substantially less than the corresponding horizontal distance (indicated by arrow 67) between the contact point 62 of the prior art sensor arm 16 and the location of a vertical line 64 passing through the axis of rotation of the sensor shaft 17. This shows that as an elevation or rise (or recess) in the ground is encountered, for example, the information from the improved sensor arm will be fed into the controller sooner than with the arm of the prior art, since the vehicle is moving to the left in FIG. 3. This results in a shorter processing time and, thus, reaction time for the control system, and this feature alone permits operation at a higher ground speed.

Figure 6:
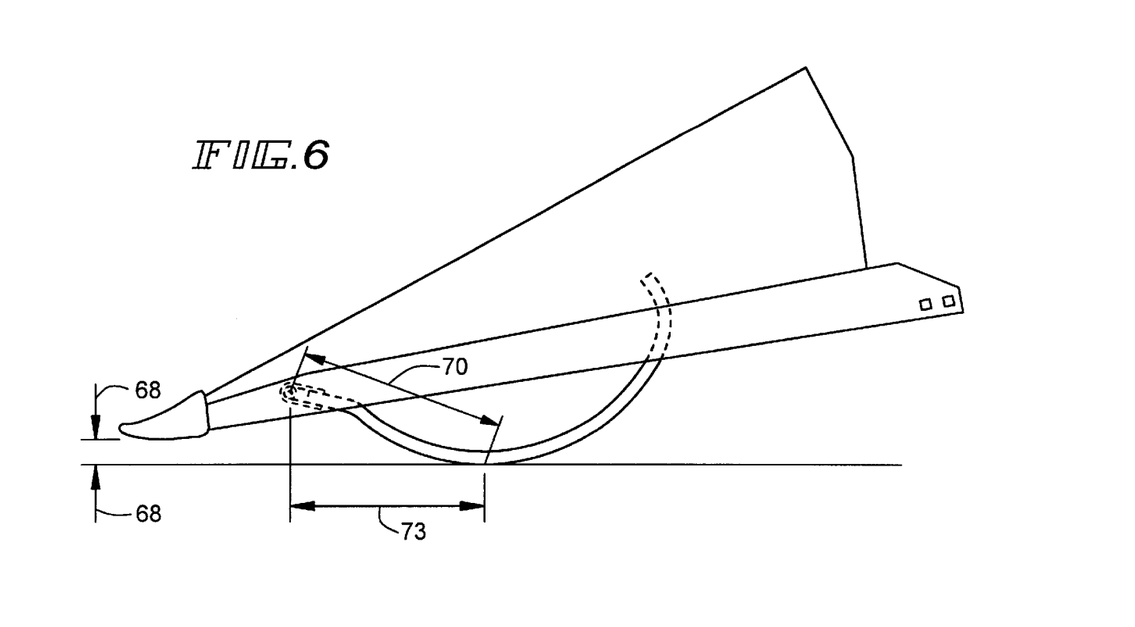
FIG. 6 is a side view of the header snout with the improved sensor arm, at a comparatively low operating height setting.
Figure 7:
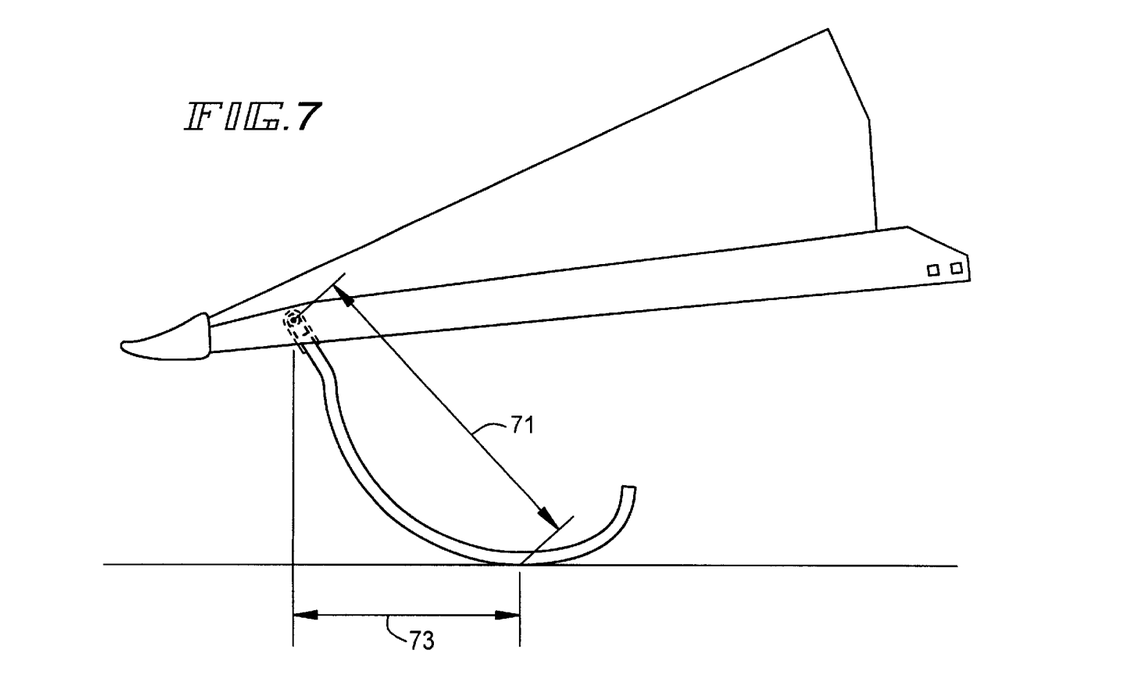
FIG. 7 is a view similar to FIG. 6 with the snout raised to a higher operating height.

However, there is a second advantage of the present invention which results from the use of a curved forward operating segment. The advantages of two curved operating sections on the sensor arm are illustrated by comparing FIGS. 6 and 7. In FIG. 6, the operating height is comparatively low. That is, there is a clearance of approximately two inches between the level of the ground and the header, as indicated by the arrows 68. In FIG. 7, the operating height is 10.5 inches. A line is drawn from the axis of rotation of the sensor shaft 17 to the point of ground contact at each of FIGS. 6 and 7. This line defines what is referred to herein as the sensor lever arm. In FIG. 6, this line is designated by reference numeral 70, and in FIG. 7, it is designated 71. It can be seen that the line 71 is substantially greater than the line 70. As the operating height decreases (FIG. 7 to FIG. 6), the sensor lever arm decreases; and it increases as the operating height of the header increases. Preferably, the curvature of the sensor arm provides a result in that the length of the lever arm change substantially continuously as the header height setting changes over substantially the entire operating range.

As the lever arm shortens, there is a corresponding greater angular displacement of the sensor shaft for a given height of ground rise. For example, comparing FIGS. 6 and 7 again, if a ground rise of one inch is encountered at the point of contact, it can be seen that due to the shortened lever arm 70, the relationship in FIG. 6 will produce a greater angular displacement of the sensor shaft 17, and thus a greater error signal forcing the hydraulic control system to raise the header with greater force. On the other hand, when the system in the position of FIG. 7 encounters a one-inch ground rise, the sensor arm will raise, and the angular displacement of the sensor shaft will be substantially less than was the case for FIG. 6. The same is true for a depression or downward slope in the ground. That is, the magnitude of angular displacement of the rotary sensor shaft 17 for a given vertical movement of the ground contact point increases for lower settings of the operating height.

In FIGS. 6 and 7, the arrow 73 indicates the horizontal distance between the center of the sensor shaft and the ground contact point. This distance is significantly reduced from the prior art shown in FIG. 2 for substantially all operating heights. The continuous curvature of the sensor arm thus reduces the system response time, all other factors being equal.

Thus, in summary, the improved system of the present invention not only produces a signal to the hydraulic controller in a shorter period of time than the prior art, due to the shortened horizontal distance between the axis of rotation of the sensor shaft and the point of ground contact, but it also produces a response of greater intensity at lower operating heights due to the fact that the forward segment of the operating portion of the sensor arm is curved, thereby shortening the lever arm and urging the sensor shaft in greater angular displacement, and producing a response of greater intensity for lower operating heights. This is sometimes referred to as a "ratio changing" relationship, and preferably it extends over substantially the entire operating portion. That is, the ratio of the angular displacement of the sensor shaft to a ground disturbance (a rise or a depression) of a given height increases as the operating height of the header is lowered. Curvature of the sensor arm, as mentioned, is deemed important because this structure advantageously decreases the response time and increases the response magnitude when the header is set at lower operating height, which is when the faster response times and increased response magnitude have a greater effect in permitting increased speed for the combine without grounding the header.

Figure 8:
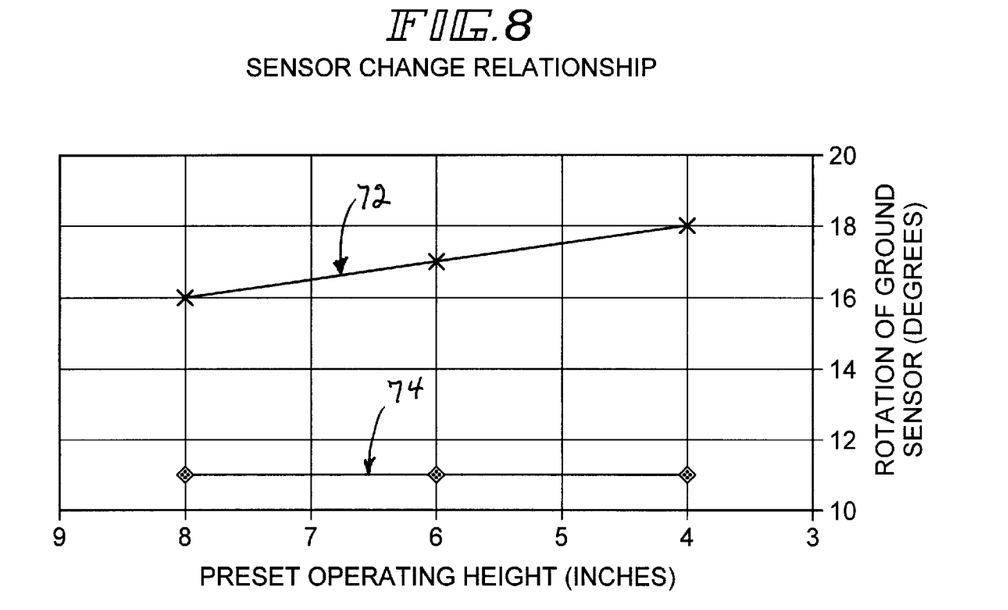
FIG. 8 is a graph comparing the magnitude of response of the inventive system with the prior art for a range of preset operating heights.

Turning now to FIG. 8, there is shown a graph comparing one aspect of the response of the inventive system, as indicated by the line 72, with the response of the prior art system which is indicated by the line 74. In the graph, the vertical axis represents the angular displacement (or rotation) of the sensor member in degrees, and the horizontal axis represents the preset operating height of the header in inches, as set by the operator. The horizontal axis decreases from left to right. Thus, as can be seen in the graph, in lowering the operating height from 6 inches to 4 inches, the angular displacement of the prior art as represented by line 74 remains constant, whereas the rotation of the sensor member for the improved sensor arm as indicated by line 72 increases from about 17° to 18°, an increase of approximately 6 percent. What is not shown in the graph of FIG. 8, but which adds to the improved operating results of the present invention is that as the operating height of the header is reduced, the contact point of the sensor arm, due to the curvature thereof, is moved forwardly, thereby reducing the system response time, so that not only is the magnitude of the control system response increased, but the reaction time is reduced for a given ground disturbance, whether it is a rise, an upward slop, a depression or a downward slope of the ground.

Thus, not only is the sensing time delay reduced, but the control system response magnitude is increased. Both features permit faster harvest speeds and lower operating heights for the header, thereby increasing combine operating efficiency, reducing the potential for header damage, and lowering operating fatigue.

Having thus disclosed in detail two embodiments of the invention, persons skilled in the art will be able to modify certain of the relationships and dimensions disclosed and to substitute equivalent structure for that which has been disclosed while continuing to practice the principle of the invention; and it is, therefore, intended that all such modifications and substitutions be covered as they are embraced within the spirit and scope of the appended claims.

I claim:

1. In an agricultural machine having an adjustable platform supported by the machine and a control system for setting an operating height of said platform relative to the ground, said control system including a sensor responsive to an angular position of a shaft and generating a signal representative of said operating height, a sensor arm coupled to said shaft and comprising an operating portion for contacting the ground and being curved at the segment of said operating portion adjacent said shaft, such that the distance between a center of rotation of said shaft and the point at which said sensor arm contacts the ground decreases as the operating height of said platform is decreased.

2. The apparatus of claim 1 wherein the curvature of said sensor arm extends substantially continuously over said operating portion thereof.

3. The apparatus of claim 2 wherein said sensor arm includes a forward curved portion extending from a location adjacent said shaft rearwardly to a transition region and having a first radius of curvature, and a second curved portion rearward of said first curved portion and extending from said transition region to a location adjacent the rear end of said operational region of said sensor shaft and having a second radius of curvature.

4. The apparatus of claim 3 characterized in that said first radius of curvature is less than said second radius of curvature.

5. The apparatus of claim 1 wherein said curved operating portion of said sensor arm comprises a plurality of discrete curved portions extending adjacent one another over substantially the entire operating portion of said sensor arm.

6. The apparatus of claim 2 wherein the curvature of said sensor arm is such that an angular displacement of said shaft increases for a given height of ground rise as the operating height of said platform decreases.

7. In an agricultural machine having a platform carried by the machine, and a control system for setting an operating height of said platform relative to the ground, said control system including a sensor mechanism comprising a member rotatable about an axis, a sensor arm mounted to said rotatable member and including an operating portion for contacting the ground, characterized in that a forward segment of said operating portion is substantially continuously curved whereby when said platform is set at a lower operating height, the distance between said rotatable member and the point at which said arm contacts the ground continuously decreases as the operating height of said platform is decreased.

8. The apparatus of claim 7 wherein said curved portion of said sensor arm comprises a first curved portion having a substantially constant first radius of curvature, and said sensor arm includes a second curved segment rearward of said first curved segment and characterized in having a second radius of curvature, said second radius of curvature being greater than said first radius of curvature, whereby the magnitude of response of said control system is greater for lower operating heights of said platform than is the response magnitude for higher operating heights of said platform.

9. The apparatus of claim 7 wherein said sensor arm has a curvature of said operating portion thereof which is such that an angular displacement of said shaft increases for a given height of ground rise as the operating height of said platform decreases.

* * * * *

UNITED STATES PATENT AND TRADEMARK OFFICE
CERTIFICATE OF CORRECTION

PATENT NO. : 6,523,333 B2
DATED : February 25, 2003
INVENTOR(S) : Metzger

It is certified that error appears in the above-identified patent and that said Letters Patent is hereby corrected as shown below:

<u>Title page,</u>
Item [75], Inventors, the town and zip code are to be changed as follows:
-- Inventor: Leo A. Metzger, 4127 Dungan Rd., Circleville, OH (US) 43113 --

<u>Column 7,</u>
Line 52, fourth word "slop" should read -- slope --

Signed and Sealed this

Fifth Day of August, 2003

JAMES E. ROGAN
*Director of the United States Patent and Trademark Office*

(12) INTER PARTES REEXAMINATION CERTIFICATE (603rd)

United States Patent
Metzger (10) Number: US 6,523,333 C1
(45) Certificate Issued: May 22, 2013

(54) SENSOR ARM FOR COMBINE HEADER

(76) Inventor: Leo A. Metzger, Circleview, OH (US)

Reexamination Request:
No. 95/000,115, Nov. 28, 2005

Reexamination Certificate for:
Patent No.: 6,523,333
Issued: Feb. 25, 2003
Appl. No.: 09/731,145
Filed: Dec. 6, 2000

Certificate of Correction issued Aug. 5, 2003

(51) Int. Cl.
*A01D 75/28* (2006.01)

(52) U.S. Cl.
USPC ............... 56/10.2 E; 56/208; 56/DIG. 10

(58) Field of Classification Search
USPC .............. 56/10.2 E, 10.2 B, 208, DIG. 10,
56/14.9, 15.8, 10.4, 34, 35, 209, 10.2 R, DIG.
15; 172/7, 8; 364/424.07
See application file for complete search history.

(56) References Cited

To view the complete listing of prior art documents cited during the proceeding for Reexamination Control Number 95/000,115, please refer to the USPTO's public Patent Application Information Retrieval (PAIR) system under the Display References tab.

*Primary Examiner* — Sara S. Clarke (57) ABSTRACT

In a control system for an agricultural combine having an adjustable platform, a sensor arm is coupled to a rotatable sensor shaft and adapted to engage and ride along the ground to monitor the operating height of the platform. The sensor arm has a continuously curved operation portion and provides a faster response time as ground contour changes are encountered. Moreover, the response increases for lower operating heights to reduce the possibility that the platform will contact the ground and to reduce the time to adjust the operating height to the desired setting. Thus, operating speed and productivity may be increased.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-9 are cancelled.

\* \* \* \* \*